US012807532B2

(12) United States Patent
Pisklak et al.

(10) Patent No.: US 12,807,532 B2
(45) Date of Patent: Nov. 24, 2026

(54) SYNTHETIC SILICA GLASS IN NON-PORTLAND CEMENTS

(71) Applicant: Halliburton Energy Services, Inc., Houston, TX (US)

(72) Inventors: Thomas Jason Pisklak, Houston, TX (US); Kyriacos Agapiou, Houston, TX (US); Samuel J Lewis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 215 days.

(21) Appl. No.: 17/807,106

(22) Filed: Jun. 15, 2022

(65) Prior Publication Data

US 2023/0406765 A1 Dec. 21, 2023

(51) Int. Cl.

| | |
|---|---|
| ***C04B 14/22*** | (2006.01) |
| ***C04B 7/02*** | (2006.01) |
| ***C04B 7/32*** | (2006.01) |
| ***C04B 7/34*** | (2006.01) |

(52) U.S. Cl.

CPC ................ *C04B 14/22* (2013.01); *C04B 7/02* (2013.01); *C04B 7/32* (2013.01); *C04B 7/34* (2013.01)

(58) Field of Classification Search

CPC .. C04B 14/22; C04B 7/02; C04B 7/32; C04B 7/34; C04B 28/06; C04B 28/04; C04B 22/0026; C04B 20/0076; C04B 18/08; C04B 18/162; C04B 28/30; C04B 22/064

See application file for complete search history.

(56) References Cited

U.S. PATENT DOCUMENTS

| | | | |
|---|---|---|---|
| 6,904,971 | B2 | 6/2005 | Brothers et al. |
| 7,255,739 | B2 | 8/2007 | Brothers et al. |
| 7,381,263 | B2 | 6/2008 | Roddy et al. |
| 9,550,934 | B2 | 1/2017 | Karcher et al. |
| 9,751,803 | B2 | 9/2017 | Karcher et al. |

(Continued)

FOREIGN PATENT DOCUMENTS

| | | |
|---|---|---|
| CN | 108726906 B | 12/2020 |
| JP | 2005047771 A | 8/2007 |

(Continued)

OTHER PUBLICATIONS

Vafaei et al., "High strength geopolymer binder based on waste-glass powder", in Advanced Powder Technology, pp. 215-222, 2016 (Year: 2016).*

(Continued)

*Primary Examiner* — Pamela H Weiss

(74) *Attorney, Agent, or Firm* — Sheri Higgins Law, PLLC; Sheri Higgins

(57) ABSTRACT

A cement composition can include water and a blended cement. The cement composition can be free of Portland cement. The blended cement can include cement and a supplementary cementitious material. The cement can be calcium aluminate cement or calcium aluminophosphate cement. Fly ash is a common supplementary cementitious material containing silica. However, fly ash can have large variances depending on the source of the fly ash. Instead of fly ash, the supplementary cementitious material can be ground synthetic glass, such as soda-lime glass, which has consistent properties regardless of the source.

20 Claims, 5 Drawing Sheets

(56) References Cited

U.S. PATENT DOCUMENTS

| | | | | |
|---|---|---|---|---|
| 10,351,753 | B2 | 7/2019 | Agapiou et al. | |
| 2004/0003759 | A1 * | 1/2004 | Brothers | C09K 8/46 106/819 |
| 2010/0240556 | A1 | 9/2010 | Keys et al. | |
| 2016/0039716 | A1 * | 2/2016 | Tagnit-Hamou | C04B 28/02 524/5 |
| 2018/0171204 | A1 * | 6/2018 | Agapiou | C09K 8/467 |

FOREIGN PATENT DOCUMENTS

| | | | | |
|---|---|---|---|---|
| WO | 1992017413 | A1 | 10/1992 | |
| WO | WO-9816483 | A1 * | 4/1998 | C04B 14/22 |
| WO | 2010106308 | A1 | 9/2010 | |
| WO | 2020050857 | A1 | 3/2020 | |

OTHER PUBLICATIONS

Kalpakli, Y. "Effects of particle size distribution on the refractory properties and corrosion mechanism of ultra-low cement castables", in Archives of Materials Science Engineering, pp. 81-88, 2008. (Year: 2008).*

Jacoby, M. "Why glass recycling in the US is broken", in C&EN, vol. 97, Issue 6, 2019. (Year: 2019).*

Kosmatka et al. "Design and Control of Concrete Mixtures", Portland Cement Association, 15th Edition, pp. ii, 87, and 118, 2011. (Year: 2011).*

Development Ultra High Perf. Concrete Using Glass Powder Toward Ecofriendly Concrete Soliman Tagnit Hamou Constructigon and Building Materilas 125 600-612 (Year: 2016).*

Impact of Combined use of ground glass powder and crushed glass aggregate on selected properties of portland cement Afshinnia Prasada Contstruction building materials vol. 117 p. 263-272 (Year: 2016).*

Recylign of waste glass as aggregate in cement based materials Harrison Berenjian Seifan Environ Science and Ecotehnology vol. 4 1000064 (Year: 2020).*

Caijun Shi et al. "A review on the use of waste glasses in the production of cement and concrete", Resources Conservation & Recycling, 2007, vol. 52, pp. 234-247.

* cited by examiner

SYNTHETIC SILICA GLASS IN NON-PORTLAND CEMENTS

TECHNICAL FIELD

Cement compositions containing Portland cement may not be used in certain wells. A blended cement composition including a calcium aluminate or calcium aluminophosphate cement and a supplementary cementitious material of ground synthetic silica glass can be used instead of Portland cement.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
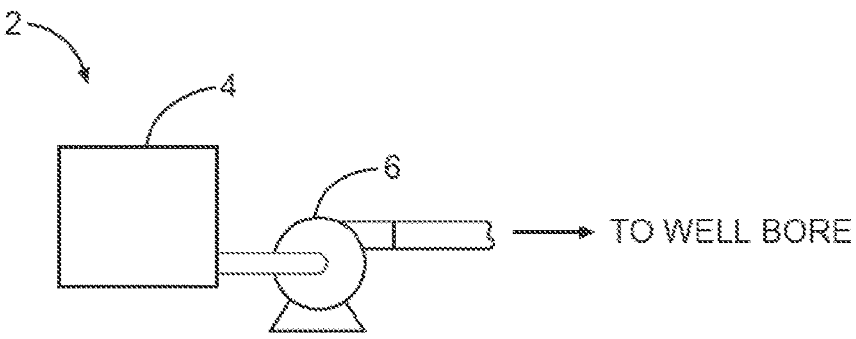
FIG. 1 illustrates a system for preparation and delivery of a cement composition to a wellbore according to certain embodiments.

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71 °F (22 °C) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a well" means and includes into any portion of the well, including into the wellbore, into the near-wellbore region via the wellbore, or into the subterranean formation via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During well completion, it is common to introduce a cement composition into an annulus in a wellbore. For example, in a cased-hole wellbore, a cement composition can be placed into and allowed to set in the annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or squeeze cementing.

As used herein, a "cement composition" is a mixture of at least cement and water. A cement composition can include additives, such as a pozzolan. As used herein, the term "cement" means an initially dry substance that develops compressive strength or sets in the presence of water. Some examples of cements include, but are not limited to, Portland cements, gypsum cements, high alumina content cements, slag cements, high magnesia content cements, sorel cements, and combinations thereof. A cement composition is a heterogeneous fluid including water as the base fluid and continuous phase of the slurry and the cement (and any other insoluble particles) as the dispersed phase. The continuous phase of a cement composition can include dissolved substances.

Portland cements can be limited in their use in certain types of wells. Portland cements can be classified as Classes A, C, H, and G cements according to American Petroleum Institute, API Specification for Materials and Testing for Well Cements, API Specification 10, Fifth Ed., Jul. 1, 1990. Portland cements can also be classified as type I, type II, type III, type IV, or type V cements according to the American National Standards Institute. By way of example, in high temperature wells (i.e., wells having a bottomhole temperature greater than 230 °F (110 °C) Portland cements can lose structural integrity by being broken down from the high temperature. Additives can be included in Portland cement to increase its thermal stability. For example, by including a silica additive, the thermal stability of Portland cement can be increased to approximately 600 °F (315.6 °C). By way of another example, a well, for example a geothermal well, can include reactive substances such as carbon dioxide, hydrogen sulfide, or acids. These substances can react in a corrosive manner causing the Portland cement to break down and lose structural integrity. However, even with the use of additives, there are still certain types of wells that Portland cement cannot be used in.

Non-Portland based cement compositions can be used in these types of wells. These cement compositions may replace some or all of the Portland cement with other types of cements. An example of another type of cement that can replace Portland cement is a calcium aluminate cement (CAC). The phases of calcium aluminate cement are $C_3A$, $C_{12}A_7$, CA, $CA_2$ and $CA_6$. By contrast, the phases of Portland cement can include $C_3S$, $C_2S$, $C_3A$ and $C_4AF$. Another example of another type of cement that can replace Portland cement is a calcium aluminophosphate cement (CAP). Calcium aluminate phosphate cement may be characterized by hydration products that include the aforementioned phases produced from calcium aluminate cement hydration plus calcium phosphate, calcium oxyapatite, and hydroxyapatite. These other types of cement can have unique properties, for example, the thermal stability of CAC and CAP can be higher than that of Portland cement, and the chemical stability of CAP can be higher than that of CAC and Portland cement.

Supplementary cementitious materials (SCM), such as, pozzolan, lime, fly ash, kiln dust, or other materials can be added to cement to form a blended cement. The supplementary cementitious materials can not only help reduce the cost of the cement but can also improve the properties of the set cement through hydraulic activity or pozzolanic activity or both. As used herein, a "pozzolan" is a supplementary cementitious material having siliceous or siliceous and aluminous material which, in itself, possesses little or no cementitious value but which will, in finely divided form and in the presence of water, chemically react with a source of calcium, lime, sodium, or potassium for example, at an activation temperature to form compounds possessing cementitious properties. As used herein, the phrase "cementitious properties" means the ability to bind materials together, develop compressive strength, and set. It is to be understood that the term "pozzolan" does not necessarily indicate the exact chemical make-up of the material, but rather refers to its capability of reacting with a source of calcium and water to form compounds possessing cementitious properties. A pozzolan generally includes a silicate phase. When the pozzolan is mixed with water and a calcium source, the silicate phases of the pozzolan can undergo a hydration reaction and form hydration products of calcium silicate hydrate (often abbreviated as C—S—H) and also possibly calcium aluminate hydrate at the activation temperature for the specific pozzolan.

An example of a supplementary cementitious material is fly ash. Fly ash is a by-product of burning coal. The properties and concentration of silica in fly ash can vary greatly depending on the source of the coal. By way of example, the silica content can vary from 30% to 80% by weight depending on the source. Additionally, calcium aluminophosphate cements are pH sensitive. The calcium aluminophosphate cement may require a pH in the range of 8 to 10 for example, to begin setting. The pH of fly ash can vary from a pH of 3 to 12 depending on the source. Accordingly, depending on the pH of the fly ash, the pH of the blended cement composition can be significantly altered such that the cement composition may not begin setting without adjusting the pH of the cement composition.

Moreover, wide variances in the properties and concentration of silica in fly ash can result in undesirable properties of the blended cement composition. Such undesirable properties can include being unpumpable for a desired period of time, having an initial setting time sooner than desired, and the inability to extend the pumpability time or initial setting time. The pumpability time may range from 1 to 10 hours depending on the source of fly ash employed. As a result of these wide variances in properties and composition, the majority of fly ash sources may not be suitable for use in cementing operations because of inability to control the pumpability or initial setting times of the blended cement composition. Thus, there is a need and on-going industry wide concern for new alternatives to fly ash for blended cement compositions that do not contain non-Portland cement.

It has unexpectedly been discovered that synthetic silica glass powder can be used as the silica source of a supplementary cementitious material in non-Portland blended cement compositions. The manufacture of glass generally follows standardized procedures regardless of the location of manufacture including the materials used to manufacture the glass and what, if any, contaminates are allowed to be included. Thus, the glass powder can consistently provide desirable properties to the cement composition regardless of the source of glass. As used herein, the term "synthetic glass" means a non-crystalline, inorganic amorphous solid containing silica that is produced and not naturally occurring. Examples of naturally occurring glass include, but are not limited to, obsidians or volcanic glass, fulgurites formed by lightning strikes, tektites found on land, and microtektites found on the bottom of the ocean. Examples of produced synthetic glass include, but are not limited to, soda-lime glass, borosilicate glass, lead glass, and aluminosilicate glass.

Some of the desirable properties of a cement composition include viscosity, pumpability, thickening time, initial setting time, water requirement, and compressive strength. Viscosity is a measure of the resistance of a fluid to flow, defined as the ratio of shear stress to shear rate. Viscosity can be expressed in units of (force*time)/area. For example, viscosity can be expressed in units of dyne*s/$cm^2$ (commonly referred to as Poise (P)) or expressed in units of Pascals/second (Pa/s). However, because a material that has a viscosity of 1 P is a relatively viscous material, viscosity is more commonly expressed in units of centipoise (cP), which is 1/100 P. The viscosity of a material and pourability are inversely related. The higher the viscosity, the less easily the material can be poured. Conversely, the lower the viscosity, the more easily the material can be poured.

As used herein, the "viscosity" of a material is measured according to API RP 10B-2/ISO 10426-2 as follows. The material to be tested, such as an aqueous solution or a suspension, is prepared. The material is placed into the test cell of a rotational viscometer, such as a FANN® Model 35 viscometer, fitted with a FANN® Yield Stress Adapter (FYSA) The material is tested at ambient temperature and pressure, about 71 °F (22 °C) and about 1 atm (0.1 MPa). Viscosity can be calculated using the following equation, expressed in units of centipoise:

$$V = \frac{k_1\,(1000)\,\theta}{k_2\ \ N}$$

where $k_1$ is a constant that depends on the FYSA in units of 1/s; $k_2$ is a constant that depends on the FYSA in units of Pa; (1000) is the conversion constant from Pa*s to centipoise; θ is the dial reading on the viscometer; and N is the rpm.

During cementing operations, it is desirable for the cement composition to remain pumpable during introduction into a wellbore and until the cement composition is situated in the portion of the wellbore to be cemented. After the cement composition has reached the portion of the wellbore to be cemented, the cement composition can ultimately set. A cement composition that thickens too quickly while being pumped can damage pumping equipment or block tubing or pipes, and a cement composition that sets too slowly can cost time and money while waiting for the composition to set.

If any test (e.g., thickening time or compressive strength) requires the step of mixing, then the cement composition is "mixed" according to the following procedure. The water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). It is to be understood that the cement composition is mixed at ambient temperature and pressure (about 71 °F (22 °C) and about 1 atm (0.1 MPa)).

It is also to be understood that if any test (e.g., thickening time or compressive strength) specifies the test be performed at a specified temperature and possibly a specified pressure, then the temperature and pressure of the cement composition is ramped up to the specified temperature and pressure after being mixed at ambient temperature and pressure. For example, the cement composition can be mixed at 71 °F (22 °C) and 1 atm (0.1 MPa) and then placed into the testing apparatus and the temperature of the cement composition can be ramped up to the specified temperature. As used herein, the rate of ramping up the temperature is in the range of about 3 °F/min to about 5 °F/min (about 1.5 °C/min to about 3 °C/min). After the cement composition is ramped up to the specified temperature and possibly pressure, the cement composition is maintained at that temperature and pressure for the duration of the testing.

As used herein, the "thickening time" is how long it takes for a cement composition to become unpumpable at a specified temperature and pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition is considered "unpumpable" when the consistency of the composition reaches 70 Bc. As used herein, the consistency of a cement composition is measured as follows. The cement composition is mixed. The cement composition is then placed in the test cell of a High-Temperature, High-Pressure (HTHP) consistometer, such as a FANN® Model 290 or a Chandler Model 8240. Consistency measurements are taken continuously until the cement composition exceeds 70 Bc.

A cement composition can develop compressive strength. Cement composition compressive strengths can vary from 0 psi to over 10,000 psi (0 to over 69 MPa). Compressive strength is generally measured at a specified time after the composition has been mixed and at a specified temperature and pressure. Compressive strength can be measured, for example, at a time of 24 hours. According to ANSI/API Recommended Practice 10B-2, compressive strength can be measured by either a destructive method or non-destructive method.

The destructive method mechanically tests the compressive strength of a cement composition sample taken at a specified time after mixing and by breaking the samples in a compression-testing device, such as a Super L Universal testing machine model 602, available from Tinius Olsen, Horsham in Pennsylvania, USA. According to the destructive method, compressive strength is calculated as the force required to break the sample divided by the smallest cross-sectional area in contact with the load-bearing plates of the compression-testing device. The compressive strength is reported in units of pressure, such as pound-force per square inch (psi) or megapascals (MPa).

The non-destructive method continually measures correlated compressive strength of a cement composition sample throughout the test period by utilizing a non-destructive sonic device such as an Ultrasonic Cement Analyzer (UCA) available from FANN® Instruments in Houston, Texas, USA. As used herein, the "compressive strength" of a cement composition is measured using the non-destructive method at a specified time, temperature, and pressure as follows. The cement composition is mixed. The cement composition is then placed in an Ultrasonic Cement Analyzer and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as psi or MPa.

The compressive strength of a cement composition can be used to indicate whether the cement composition has initially set or set. As used herein, a cement composition is considered "initially set" when the cement composition develops a compressive strength of 50 psi (0.3 MPa) using the non-destructive compressive strength method at a specified temperature and a pressure of 3,000 psi (20 MPa). As used herein, the "initial setting time" is the difference in time between when the cement and any other ingredients are added to the water and when the composition is initially set.

As used herein, the term "set," and all grammatical variations thereof, are intended to mean the process of becoming hard or solid by curing. As used herein, the "setting time" is the difference in time between when the cement and any other ingredients are added to the water and when the composition has set at a specified temperature. It can take up to 48 hours or longer for a cement composition to set. Some cement compositions can continue to develop compressive strength over the course of several days. The compressive strength of a cement composition can reach over 10,000 psi (69 MPa).

Any of the components of a cement can be analyzed to determine their water requirement by any method. The water requirement may be defined broadly as the amount of mixing water that is required to be added to a powdered, solid material to form a slurry of a specified consistency.

One example technique for determining the water requirement holds the consistency and amount of water constant while varying the amount of the solid material. However, techniques can also be applied that vary the amount of the water, the consistency, and/or the amount of solid material in any combination. As used herein, the "water requirement" of a supplementary cementitious material is measured as follows. Prepare a blender (e.g., Waring® blender) with a specified amount of water (e.g., about 100 grams to about 500 grams), agitate the water at a specified blender rpm (e.g., 4,000 to 15,000 rpm). With the motor of the blender running, begin adding the powdered supplementary cementitious material that is being tested to the water and evaluating the consistency of the slurry. Continue adding the powdered supplementary cementitious material until a specified consistency is obtained. Then calculate the water requirement based on the ratio of water to solids required to obtain the desired consistency. The specified consistency was when the supplementary cementitious material is considered thoroughly wet and mixed and when the vortex formed at the surface of the mixture in the blender is about 0.7 in (17.9 mm).

A cement composition can include: water; and a blended cement, wherein the blended cement comprises: cement, wherein 0% weight by weight of the cement is Portland cement; and a supplementary cementitious material, wherein the supplementary cementitious material is ground synthetic glass.

Methods of cementing in a wellbore can include introducing the cement composition into the well and allowing the cement composition to set.

It is to be understood that the discussion of any of the embodiments regarding the cement composition or any ingredient in the cement composition is intended to apply to all of the method and composition embodiments without the need to repeat the various embodiments throughout. Any reference to the unit "gallons" means U.S. gallons.

The cement composition includes water as the base fluid. The water can be selected from the group consisting of freshwater, brackish water, and saltwater, in any combination thereof in any proportion. The cement composition can further include a hydrocarbon liquid. The cement composition can also include a water-soluble salt. The salt according to any of the embodiments can be selected from sodium chloride, calcium chloride, calcium bromide, potassium chloride, potassium bromide, magnesium chloride, and any combination thereof in any proportion. The salt can be in a concentration in the range of about 0.1% to about 40% by weight of the water.

The cement composition includes a blended cement. The blended cement can be a hydraulic cement. The blended cement includes cement. According to certain embodiments, the cement is a non-Portland cement (i.e., 0 w/w % of the total amount of cement is Portland cement).

The cement of the blended cement can be a calcium aluminate cement (CAC). The cement can also be a calcium aluminophosphate (CAP) cement. The exact makeup of the CAC or CAP cement can vary. The phases of the cement can also vary. By way of example, the CAC cement can contain over 35% to over 70% alumina ($Al_2O_3$). The calcium aluminate cement can be in a concentration in the range of 20% to 80% by weight of the blended cement. For a CAP cement, the phosphate can be in a concentration in the range of 1% to 10% by weight of the blended cement.

The blended cement also includes a supplementary cementitious material. The supplementary cementitious material can be a pozzolan. The pozzolan includes a silicate. The supplementary cementitious material can be ground synthetic glass. The ground synthetic glass can include silica. The ground synthetic glass can be selected from the group consisting of soda-lime glass, borosilicate glass, lead glass, aluminosilicate glass, germanosilicate glass (optical glass), phosphosilicate glass, silicate filter glasses, and combinations thereof. Silicate glasses are historically the oldest types of glasses which were manufactured by humans and are still the most common glasses. Silicate glasses largely consist of silicon dioxide (silica, $SiO_2$), but in contrast to pure silica glass (fused silica) they contain some additional substances like soda, alumina, phosphorus pentoxide, germania, and potassium carbonate. Depending on the composition, one arrives at names like aluminosilicate, germanosilicate, aluminogermanosilicate, borosilicate, phosphosilicate glass, etc. According to any of the embodiments, the supplementary cementitious material does not include fly ash.

The ground synthetic glass can be in a concentration in the range of 20% to 80% by weight of the blended cement. The ground synthetic glass can be recycled glass. One advantage is that by replacing the burning of coal, in which fly ash is a by-product, with glass and by using recycled glass, the compounds in the blended cement are more environmentally friendly compared to pozzolans that include fly ash.

The supplementary cementitious material can have a particle size selected such that when mixed with the water, the mixture has cementitious properties. As discussed above, if the supplementary cementitious material is in finely divided form, it can chemically react with water to develop cementitious properties. According to any of the embodiments, the cement and the supplementary cementitious material have a mesh size less than or equal to 20 mesh (≤0.8 millimeters (mm)). The cement and the supplementary cementitious material can have a mesh size in the range of 500 mesh to 20 mesh (0.025 to 0.8 mm).

The ground synthetic glass can be colorless, also known as clear glass. All or a portion of the ground synthetic glass can also be selected from colored glass. The color of glass can vary and can include, for example, red, blue, green, yellow, and combinations thereof. Different colors of glass may affect the properties of the glass. According to any of the embodiments, if colored glass is used, then the exact color (e.g., red or green) can be selected such that the ground silica glass possesses desirable properties. Glass can be colored by adding a dopant in the manufacturing process. The making of colored glass is generally very standardized and thus, substantial variations between the same color of 2 different sources of glass should not occur. Thus, as opposed to fly ash, wide variations in the properties of the ground silica glass should not occur regardless of the source of the glass.

The cement composition can have a thickening time of at least 1 hour at a temperature of 200 °F (93.3 °C) and a pressure of 9,500 psi (65 MPa). In another embodiment, the cement composition has a thickening time in the range of about 4 to about 15 hours at a temperature of 200 °F (93.3 °C) and a pressure of 9,500 psi (65 MPa). Some of the variables that can affect the thickening time of the cement composition include the concentration of any set retarder included in the cement composition, the concentration of any salt present in the cement composition, and the bottomhole temperature of the subterranean formation. As used herein, the term "bottomhole" refers to the portion of the well to be cemented. In another embodiment, the cement composition has a thickening time of at least 3 hours at the bottomhole temperature and pressure of the well. The cement composition can have a consistency of less than 5 Bc for at least 1 hour at a temperature of 200 °F (93.3 °C) and a pressure of 9,500 psi (65 MPa).

The cement composition can have an initial setting time of less than 24 hours at a temperature of 200 °F (93.3 °C) and a pressure of 9,500 psi (65 MPa) or the bottomhole temperature and pressure of the well.

The cement composition can have a setting time of less than 48 hours at a temperature of 200 °F (93.3 °C) and a pressure of 9,500 psi (65 MPa). The cement composition can have a setting time of less than 24 hours at a temperature of 200 °F (93.3 °C) and a pressure of 9,500 psi (65 MPa). According to any of the embodiments, the cement composition has a setting time in the range of 3 to 24 hours at a temperature of 200 °F (93.3 °C) and a pressure of 9,500 psi (65 MPa) or the bottomhole temperature and pressure of the well.

The cement composition can have a compressive strength of at least 500 psi (3.5 MPa) when tested at 24 hours, a temperature of 125 °F (51 °C), and a pressure of 3,000 psi (21 MPa). The cement composition can have a compressive strength in the range of 500 to 10,000 psi (about 3.5 to about 69 MPa) when tested at 24 hours, a temperature of 125 °F (51 °C), and a pressure of 3,000 psi (21 MPa).

The cement composition can further include additional additives. Examples of additional additives include, but are not limited to, a high-density additive, a filler, a strength-retrogression additive, a set accelerator, a set retarder, a friction reducer, a mechanical property enhancing additive, a lost-circulation material, a filtration-control additive, a defoaming agent, a thixotropic additive, a nanoparticle, and combinations thereof. The cement composition can also include a second supplementary cementitious material. The second supplementary cementitious material can include lime or kiln dust.

The cement composition can have a density of at least 4 pounds per gallon (ppg) (0.48 kilograms per liter (kg/l)). The cement composition can have a density in the range of 4 to 20 ppg (about 0.48 to about 2.4 kg/l). It has unexpectedly been discovered that the cement composition containing the ground synthetic glass has a higher water requirement compared to a similar cement composition containing fly ash as the source of silica. It has also unexpectedly been discovered that the cement composition has a lower viscosity than was expected based on the higher water requirement. Therefore, the water can be pulled out of the cement composition to create a higher density cement slurry without affecting the pumpability (i.e., the thickening time) or affecting the viscosity or having to add dispersants. This means that the thickening time can be increased even in higher density cement slurries.

The methods can include mixing the water and the calcium aluminate, phosphate, and ground synthetic glass together. The methods include introducing the cement composition into a well. The methods also include the step of allowing the cement composition to set. The step of allowing can be after the step of introducing the cement composition into the well. The methods can further include the additional steps of perforating, fracturing, or performing an acidizing treatment, after the step of allowing.

The well can be an offshore or on shore well. The well can be a geothermal well. The well can be a corrosive well, for example, a carbon dioxide containing well, an acid well, or a hydrogen-sulfide containing well. A significant advantage to the blended cement is that it is corrosion resistant and can be used in high-temperature wells without losing structural integrity. A loss of structural integrity can be a decrease in compressive strength over time. The cement composition can have a desired thermal stability. Thermal stability is the maximum temperature the cement composition retains structural integrity for a desired period of time. According to any of the embodiments, the cement of the blended cement is a calcium aluminate cement, and the cement composition has a thermal stability up to 2,552 °F (1,400 °C). According to any of the embodiments, the cement of the blended cement is a calcium aluminophosphate cement, and the cement composition has a thermal stability up to 2,552 °F (1,400 °C). As discussed above, CAP cements can have a higher corrosion resistance compared to CAC. According to any of the embodiments, the well contains substances that can have a corrosive effect on the cement composition. According to this embodiment, the cement can be CAP cement. According to any of the embodiments, the cement composition does not lose compressive strength for at least 1 to 7 days after placement into the well and after setting.

An embodiment of the present disclosure is a cement composition comprising: water; and a blended cement, wherein the blended cement comprises: (i) cement, wherein less than 30% weight by weight of the cement is Portland cement; and (ii) a supplementary cementitious material, wherein the supplementary cementitious material is ground synthetic glass. Optionally, the cement composition further comprises wherein the water is selected from the group consisting of freshwater, brackish water, saltwater, and combinations thereof. Optionally, the cement composition further comprises wherein the cement is in a concentration in the range of 20% to 80% by weight of the blended cement. Optionally, the cement composition further comprises wherein the cement is a calcium aluminate cement. Optionally, the cement composition further comprises wherein the cement is a calcium aluminophosphate cement, and wherein a phosphate is in a concentration in the range of 1% to 10% by weight of the cement. Optionally, the cement composition further comprises wherein the ground synthetic glass is selected from the group consisting of soda-lime glass, borosilicate glass, lead glass, aluminosilicate glass, germanosilicate glass, phosphosilicate glass, silicate filter glasses, and combinations thereof. Optionally, the cement composition further comprises wherein the ground synthetic glass is in a concentration in the range of 20% to 80% by weight of the blended cement. Optionally, the cement composition further comprises wherein the ground synthetic glass is recycled glass. Optionally, the cement composition further comprises wherein the cement and the supplementary cementitious material have a particle size less than or equal to 0.8 millimeters. Optionally, the cement composition further comprises wherein the cement and the supplementary cementitious material have a particle size in the range of 0.025 to 0.8 millimeters. Optionally, the cement composition further comprises wherein the cement composition has a thickening time in the range of 4 to 15 hours at a temperature of 93.3 °C and a pressure of 65 millipascal. Optionally, the cement composition further comprises wherein the cement composition has a compressive strength in the range of 500 to 10,000 psi when tested at 24 hours, a temperature of 125 °F, and a pressure of 3,000 psi. Optionally, the cement composition further comprises wherein the blended cement has a water requirement at least 20% greater than a blended cement containing fly ash as the supplementary cementitious material. Optionally, the cement composition further comprises wherein the cement composition further comprises a second supplementary cementitious material, and wherein the second supplementary cementitious material is selected from lime or kiln dust. Optionally, the cement composition further comprises wherein the cement composition has a thermal stability at a temperature less than or equal to 1,400 °C.

Another embodiment of the present disclosure is a method of cementing in a well comprising: introducing a cement composition into the well, wherein the cement composition comprises: water; and a blended cement, wherein the blended cement comprises: (i) cement, wherein less than 30% weight by weight of the cement is Portland cement; and (ii) a supplementary cementitious material, wherein the supplementary cementitious material is ground synthetic glass; and allowing the cement composition to set. Optionally, the method further comprises wherein the water is selected from the group consisting of freshwater, brackish water, saltwater, and combinations thereof. Optionally, the method further comprises wherein the cement is in a concentration in the range of 20% to 80% by weight of the blended cement. Optionally, the method further comprises wherein the cement is a calcium aluminate cement. Optionally, the method further comprises wherein the cement is a calcium aluminophosphate cement, and wherein a phosphate is in a concentration in the range of 1% to 10% by weight of the cement. Optionally, the method further comprises wherein the ground synthetic glass is selected from the group consisting of soda-lime glass, borosilicate glass, lead glass, aluminosilicate glass, germanosilicate glass, phosphosilicate glass, silicate filter glasses, and combinations thereof. Optionally, the method further comprises wherein the ground synthetic glass is in a concentration in the range of 20% to 80% by weight of the blended cement. Optionally, the method further comprises wherein the ground synthetic glass is recycled glass. Optionally, the method further comprises wherein the cement and the supplementary cementitious material have a particle size less than or equal to 0.8 millimeters. Optionally, the method further comprises wherein the cement and the supplementary cementitious material have a particle size in the range of 0.025 to 0.8 millimeters. Optionally, the method further comprises wherein the cement composition has a thickening time in the range of 4 to 15 hours at a temperature of 93.3 °C and a pressure of 65 millipascal. Optionally, the method further comprises wherein the cement composition has a compressive strength in the range of 500 to 10,000 psi when tested at 24 hours, a temperature of 125 °F, and a pressure of 3,000 psi. Optionally, the method further comprises wherein the blended cement has a water requirement at least 20% greater than a blended cement containing fly ash as the supplementary cementitious material. Optionally, the method further comprises wherein the cement composition further comprises a second supplementary cementitious material, and wherein the second supplementary cementitious material is selected from lime or kiln dust. Optionally, the method further comprises wherein the cement composition has a thermal stability at a temperature less than or equal to 1,400 °C.

FIG. 1 illustrates a system that can be used in the preparation of a cement composition and delivery to a wellbore according to any of the embodiments. As shown, the cement composition can be combined in mixing equipment 4, such as a jet mixer, re-circulating mixer, or a batch mixer, for example, and then pumped via pumping equipment 6 to the wellbore. The mixing equipment 4 and the pumping equipment 6 can be located on one or more cement trucks. A jet mixer can be used, for example, to continuously mix the cement composition, including water, as it is being pumped to the wellbore.

Figure 2A:
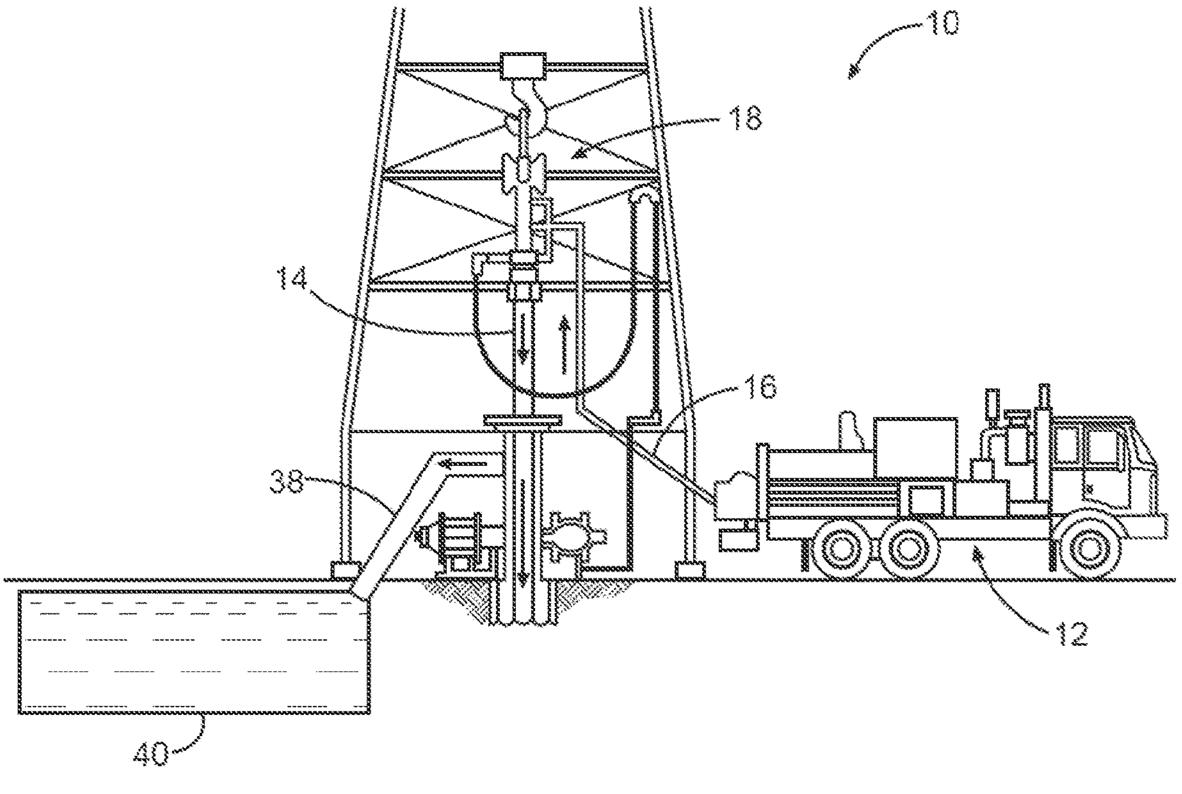
FIG. 2A illustrates surface equipment that may be used in placement of a cement composition into a wellbore.

An example technique and system for introducing the cement composition into a subterranean formation will now be described with reference to FIGS. 2A and 2B. FIG. 2A illustrates surface equipment 10 that can be used to introduce the cement composition. It should be noted that while FIG. 2A generally depicts a land-based operation, the principles described herein are equally applicable to subsea operations that employ floating or sea-based platforms and rigs, without departing from the scope of the disclosure. The surface equipment 10 can include a cementing unit 12, which can include one or more cement trucks, mixing equipment 4, and pumping equipment 6 (e.g., as depicted in FIG. 1). The cementing unit 12 can pump the cement composition 14 through a feed pipe 16 and to a cementing head 18, which conveys the cement composition 14 downhole.

The methods can include the step of introducing the cement composition into a well 22 via a wellbore that penetrates a subterranean formation 20. Turning now to FIG. 2B, the cement composition 14 can be introduced into the well 22. The step of introducing can include pumping the cement composition into the well using one or more pumps 6. The step of introducing can be for the purpose of at least one of the following: well completion; foam cementing; primary or secondary cementing operations; well-plugging; squeeze cementing; and gravel packing. The cement composition can be in a pumpable state before and during introduction into the well 22. The well can be, without limitation, an oil, gas, or water production well, an injection well, a geothermal well, or a high-temperature and high-pressure (HTHP) well. The wellbore 22 comprises walls 24. A surface casing 26 can be inserted into the wellbore 22. The surface casing 26 can be cemented to the walls 24 via a cement sheath 28. One or more additional conduits (e.g., intermediate casing, production casing, liners, etc.) shown here as casing 30 can also be disposed in the wellbore 22. One or more centralizers 34 can be attached to the casing 30, for example, to centralize the casing 30 in the wellbore 22 prior to and during the cementing operation. According to another embodiment, the subterranean formation 20 is penetrated by a wellbore 22 and the well includes an annulus 32 formed between the casing 30 and the walls 24 of the wellbore 22 and/or the surface casing 26. According to this other embodiment, the step of introducing includes introducing the cement composition into a portion of the annulus 32.

Figure 2B:
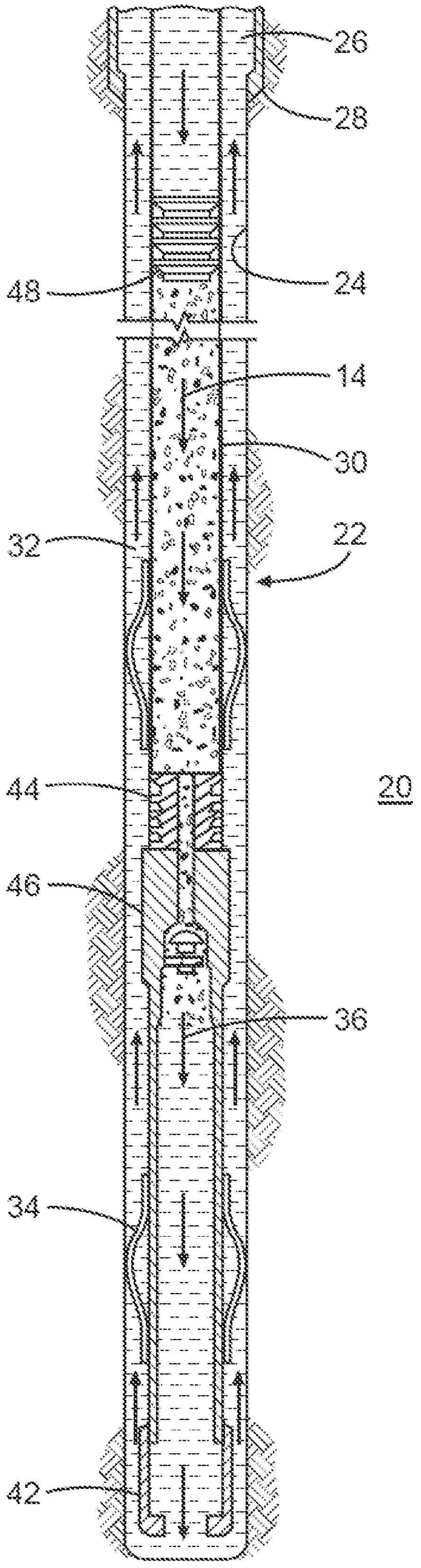
FIG. 2B illustrates placement of a cement composition into an annulus of a wellbore.

With continued reference to FIG. 2B, the cement composition 14 can be pumped down the interior of the casing 30. The cement composition 14 can be allowed to flow down the interior of the casing 30 through the casing shoe 42 at the bottom of the casing 30 and up around the casing 30 into the annulus 32. While not illustrated, other techniques can also be utilized for introduction of the cement composition 14. By way of example, reverse circulation techniques can be used that include introducing the cement composition 14 into the subterranean formation 20 by way of the annulus 32 instead of through the casing 30.

As it is introduced, the cement composition 14 may displace other fluids 36, such as drilling fluids and/or spacer fluids that may be present in the interior of the casing 30 and/or the annulus 32. At least a portion of the displaced fluids 36 can exit the annulus 32 via a flow line 38 and be deposited, for example, in one or more retention pits 40 (e.g., a mud pit), as shown on FIG. 2A. Referring again to FIG. 2B, a bottom plug 44 can be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 can be introduced into the wellbore 22 behind the cement composition 14. The top plug 48 can separate the cement composition 14 from a displacement fluid 50 and also push the cement composition 14 through the bottom plug 44.

EXAMPLES

To facilitate a better understanding of the various embodiments, the following examples are given.

All test cement compositions were mixed and tested according to the specified procedure for the specific test as described in The Detailed Description section above.

Table 1 lists the ingredients and concentrations in weight percent (wt %) of three different blended cement compositions. Compositions 1 and 2 were control cement slurries including fly ash as the silica source at two different densities and temperatures. Composition 3 included ground soda-lime glass having a particle size of 100 mesh as a replacement for the fly ash as the silica source. Composition 4 was a field test at a wellsite using ground soda-lime glass. SECAR® 71 is a calcium aluminate hydraulic cement binder containing approximately 70% alumina content and marketed by Kerneos Inc. in Chesapeake, Virginia, USA.

TABLE 1

| | Composition 1 | Composition 2 | Composition 3 | Composition 4 |
|---|---|---|---|---|
| Density (ppg) | 14.5 | 13.2 | 14.5 | 13.2 |
| SECAR ® 71 (wt %) | 47.5 | 47.5 | 47.5 | 47.5 |
| Class F fly ash (wt %) | 47.5 | 47.5 | — | — |
| Glass (wt %) | — | — | 47.5 | 47.5 |
| Sodium Hexametaphosphate (wt %) | 5 | 5 | 5 | 5 |
| Set Retarder (wt %) | — | 1.0 | — | 0.8 |
| Water (g) | 173.77 | 498.7 | 173.77 | 498.64 |
| Temperature (°F) | 200 | 150 | 200 | 150 |

Figure 3:
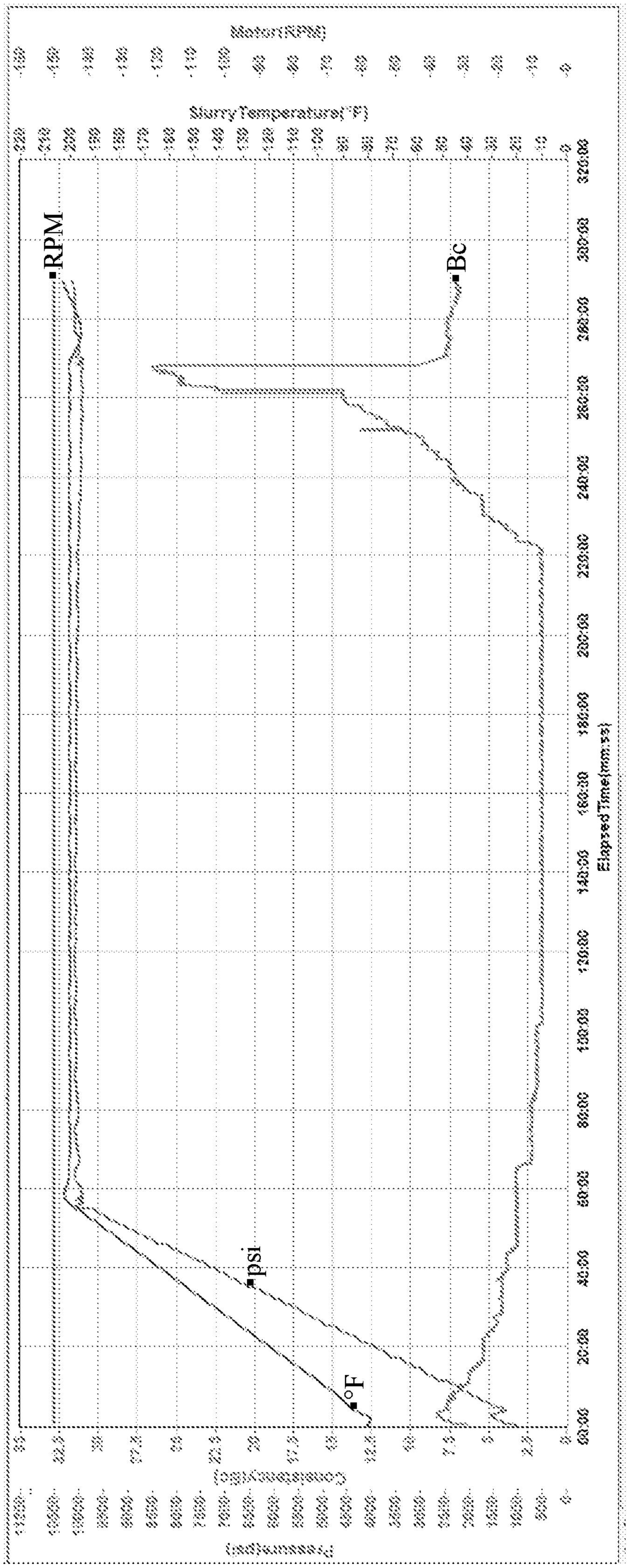
FIG. 3 is a graph of pressure, consistency, temperature, and shear stress versus time for a non-Portland based cement composition including fly ash as the source of silica.
Figure 4:
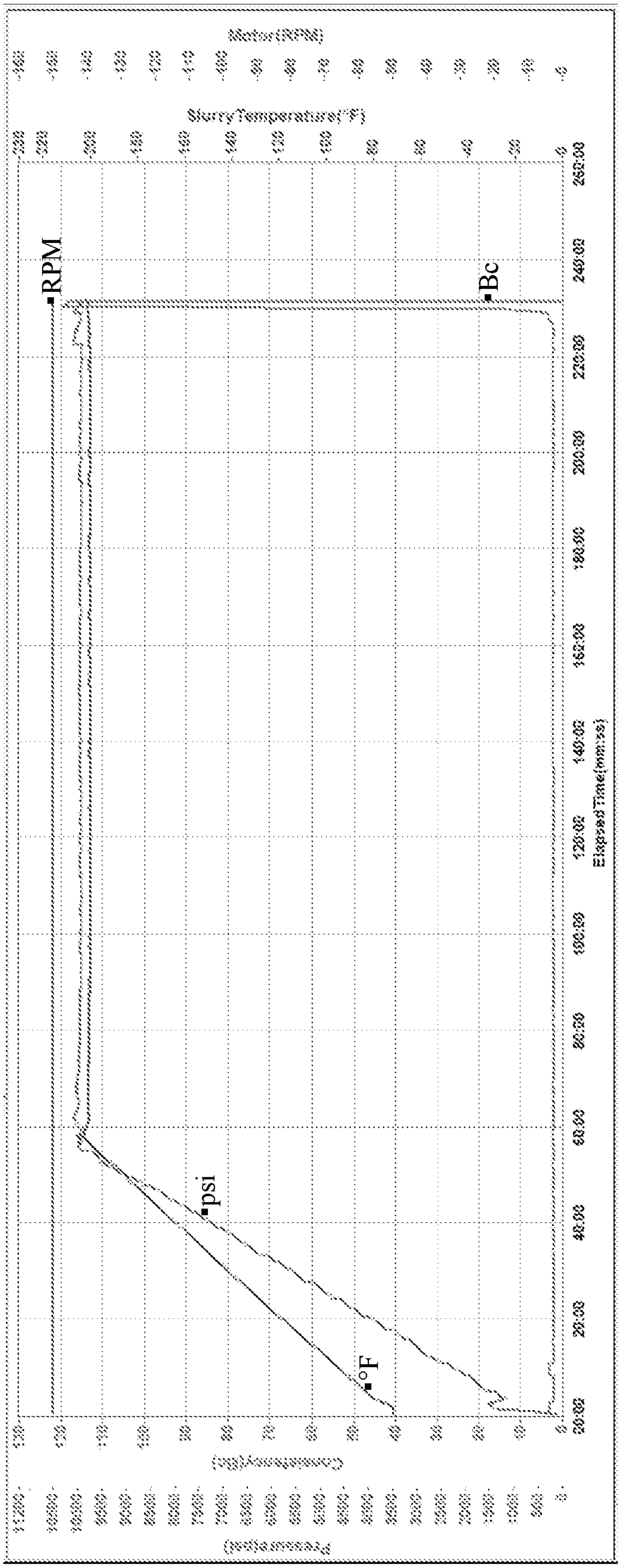
FIG. 4 is a graph of pressure, consistency, temperature, and shear stress versus time for a non-Portland based cement composition including silica glass powder as the source of silica.
Figure 5:
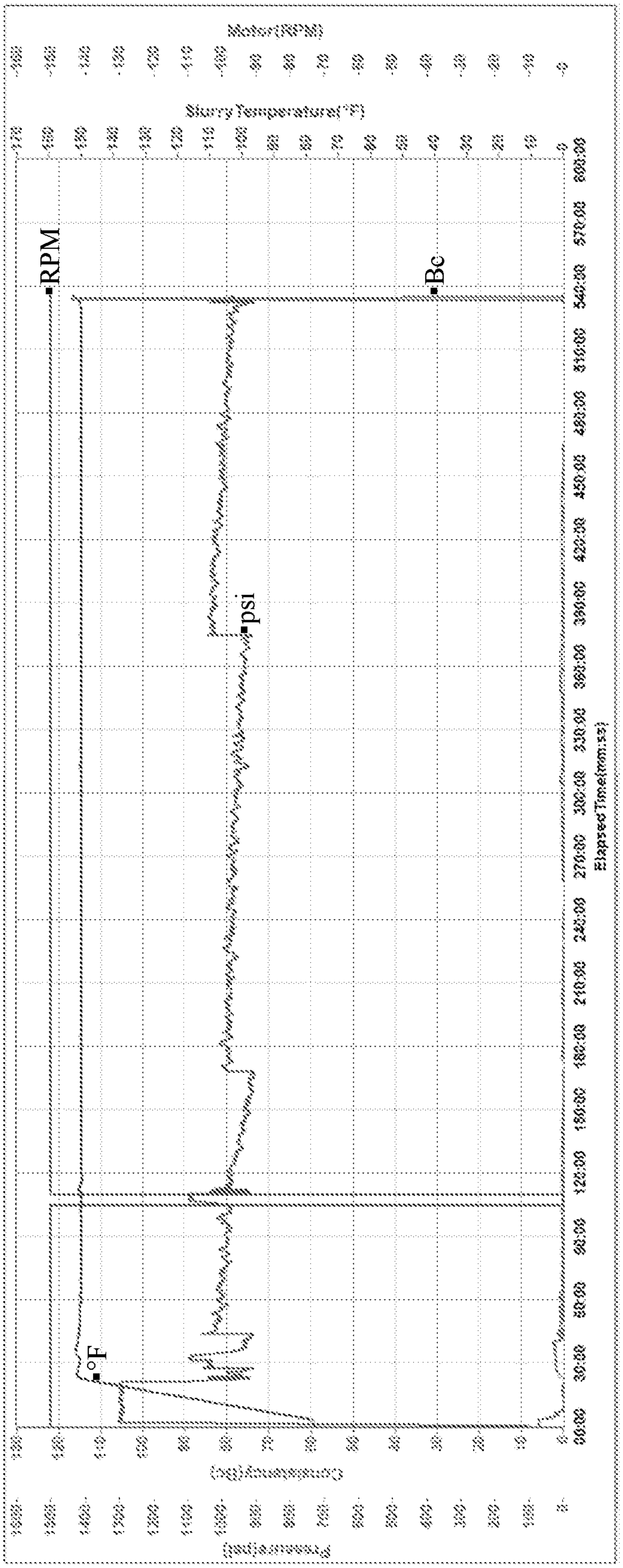
FIG. 5 is a graph of pressure, consistency, temperature, and shear stress versus time for a non-Portland based cement composition including glass powder as the source of silica in a field test.

FIGS. 3-5 are graphs of the cement compositions showing pressure (psi), consistency (Bc), temperature (°F), and shear stress (rpm) versus time (minutes:seconds). As can be seen in FIG. 3, the fly ash (composition 1) exhibited varying consistencies and had a gradual increase in consistency with the peak thickening time at approximately 4 hours 30 minutes. As can be seen in FIG. 4, the ground glass (composition 3) exhibited more consistent consistencies—essentially exhibiting a flat line around 4 Bc with a very sharp increase to 120 Bc at 3 hours 50 minutes. It was unexpected that the ground glass would exhibit a thickening time very similar to the fly ash. It was also unexpected that the ground glass would exhibit a much smoother consistency profile and a sharp spike in consistency compared to the fly ash. This indicates that not only is ground glass a suitable replacement for fly ash, but also that the ground glass can impart superior properties to the cement composition such as improved pumpability and thickening times. As can be seen in FIG. 5, the field testing with the ground glass (composition 4) not only exhibited a very similar consistency profile as shown in FIG. 4, but also the thickening time can be increased as needed for each particular well (shown with a thickening time of approximately 8 hours 50 minutes). This indicates that the pozzolan can be used in a variety of wells and should exhibit very similar properties regardless of the source of the ground glass.

Table 2 shows the compressive strength of compositions 1-3 containing the same ingredients and concentrations listed in Table 1 with the exception of different concentration of the supplementary cementitious materials (SCM).

TABLE 2

| | Composition 1 | Composition 2 | Composition 3 |
|---|---|---|---|
| Compressive Strength (psi) | 4,000 | 1,405 | 1,808 |
| Class F fly ash (wt %) | 38 | 38 | — |
| Glass (wt %) | — | — | 54 |
| Temperature (°F) | 200 | 150 | 150 |
| Pressure (psi) | 3,000 | 3,000 | 3,000 |

As can be seen in Table 2, the blended cement compositions containing fly ash as the SCM had a higher compressive strength at 200 °F for composition 1 than at 150 °F for composition 2. The blended cement composition 3 containing the ground synthetic glass as the SCM had a higher compressive strength at the same temperature of 150 °F than composition 2 containing fly ash as the SCM. This indicates that not only is ground synthetic glass a comparable substitute for fly ash, but also provides improved properties to the blended cement composition.

Table 3 shows the water requirement ("WR") of 2 different dry blends of cement containing a calcium aluminophosphate cement ("CAP") and either fly ash or ground synthetic glass. As can be seen in Table 3, it was unexpectedly discovered that the water requirement for the ground synthetic glass and dry blend containing ground synthetic glass had a higher water requirement than the fly ash and the dry blend containing fly ash. The usefulness of determining the water requirement is that by tailoring the water to solids ratio leads to more stable slurries and allows for the reduction or need for much more expensive additives, such as suspending aids and dispersants. The ground synthetic glass material was an anomaly because it required less water for a similar consistency than its corresponding water requirement would indicate. One of ordinary skill in the art understood that when the water requirement was higher for a cement composition, then the consistency and viscosity would also be higher. For example, a typical calcium aluminophosphate cement and fly ash blend yields a water requirement of approximately 35 and produces a baseline consistency reading, which is directly correlated to viscosity, of approximately 5 Bc at 200 °F (see, for example FIG. 3). So, historically, assuming a 1:1 replacement of the fly ash with a different material, only replacement materials with a similar water requirement of ~35 would give a similar consistency reading. Or stated another way, if the water requirement of the replacement material is 35% greater than the fly ash, then a 35% increase in consistency should also be observed. However, and as can be seen, the ground synthetic glass had a water requirement of 54 and yet gives a Bc reading of ~5 at 200 °F, which was the same as the fly ash. This unexpected discovery means that water can be pulled out of the cement composition to increase the density of the cement slurry without negatively affecting the pumpability or viscosity of the cement slurry.

TABLE 3

| Composition # | Material | WR of Ingredients | Wt. % in Dry Blend | WR of Dry Blend |
|---|---|---|---|---|
| 1 | CAP | 36 | 45 | 30.6 |
| 1 | Fly ash | 32 | 45 | |
| 2 | CAP | 36 | 45 | 40.5 |
| 2 | Glass | 54 | 45 | |

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the compositions, methods, and systems of the present disclosure are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present disclosure.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more fluids, etc., as the case may be, and do not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A cement composition comprising:

water; and a blended cement, wherein the blended cement comprises:

(i) only one type of cement, wherein the only one type of cement consists of a calcium aluminate cement or a calcium aluminophosphate cement; and (ii) a first supplementary cementitious material, wherein the first supplementary cementitious material consists of ground synthetic glass, wherein the blended cement has a water requirement determined by weight at least 20% greater compared to a test blended cement consisting of the only one type of cement and fly ash as the first supplementary cementitious material, wherein the cement composition does not include fly ash, wherein the cement composition has a thickening time in a range of 4 to 15 hours at a temperature of 200 °F (93.3 °C) and a pressure of 9,500 psi (65 MPa), and wherein the cement composition has a density in a range of about 4 to 20 ppg (0.48 to 2.4 kg/l).

2. The cement composition according to claim 1, wherein the water is selected from the group consisting of freshwater, brackish water, saltwater, and combinations thereof.

3. The cement composition according to claim 1, wherein the only one type of cement is in a concentration in the range of 20% to 80% by weight of the blended cement.

4. The cement composition according to claim 1, wherein the only one type of cement consists of the calcium aluminophosphate cement, and wherein a phosphate is in a concentration in the range of 1% to 10% by weight of the cement.

5. The cement composition according to claim 1, wherein the ground synthetic glass is selected from the group consisting of soda-lime glass, borosilicate glass, lead glass, aluminosilicate glass, germanosilicate glass, phosphosilicate glass, silicate filter glasses, and combinations thereof.

6. The cement composition according to claim 1, wherein the ground synthetic glass is in a concentration in the range of 20% to 80% by weight of the blended cement.

7. The cement composition according to claim 1, wherein the ground synthetic glass is recycled glass.

8. The cement composition according to claim 1, wherein the only one type of cement and the first supplementary cementitious material have a particle size less than or equal to 0.8 millimeters.

9. The cement composition according to claim 1, wherein the only one type of cement and the first supplementary cementitious material have a particle size in the range of 0.025 to 0.8 millimeters.

10. The cement composition according to claim 1, wherein the cement composition has a thickening time of at least 3 hours at a bottomhole temperature and pressure of a well.

11. The cement composition according to claim 1, wherein the cement composition has a compressive strength in the range of 500 to 10,000 psi when tested at 24 hours, a temperature of 125 °F, and a pressure of 3,000 psi.

12. The cement composition according to claim 1, wherein the cement composition further comprises a second supplementary cementitious material, and wherein the second supplementary cementitious material is selected from lime or kiln dust.

13. The cement composition according to claim 1, wherein the cement composition has a thermal stability at a temperature less than or equal to 1,400 °C.

14. A method of cementing in a well comprising:

introducing a cement composition into the well, wherein the cement composition comprises:

water; and a blended cement, wherein the blended cement comprises:

(i) only one type of cement, wherein the only one type of cement consists of a calcium aluminate cement or a calcium aluminophosphate cement; and (ii) a first supplementary cementitious material, wherein the first supplementary cementitious material consists of ground synthetic glass, wherein the blended cement has a water requirement determined by weight at least 20% greater compared to a test blended cement consisting of the only one type of cement and fly ash as the first supplementary cementitious material, wherein the cement composition does not include fly ash, wherein the cement composition has a thickening time in a range of 4 to 15 hours at a temperature of 200 °F (93.3 °C) and a pressure of 9,500 psi (65 MPa), and wherein the cement composition has a density in a range of 4 to 20 ppg (0.48 to 2.4 kg/l); and allowing the cement composition to set.

15. The method according to claim 14, wherein the only one type of cement consists of the calcium aluminophosphate cement, and wherein a phosphate is in a concentration in the range of 1% to 10% by weight of the cement.

16. The method according to claim 14, wherein the ground synthetic glass is selected from the group consisting of soda-lime glass, borosilicate glass, lead glass, aluminosilicate glass, germanosilicate glass, phosphosilicate glass, silicate filter glasses, and combinations thereof.

17. The method according to claim 14, wherein the ground synthetic glass is in a concentration in the range of 20% to 80% by weight of the blended cement.

18. The method according to claim 14, wherein the cement composition has a thermal stability at a temperature less than or equal to 1,400 °C.

19. The cement composition according to claim 1, wherein the only one type of cement and the first supplementary cementitious material are in a ratio of 1:1 by weight.

20. The method according to claim 14, wherein the only one type of cement and the first supplementary cementitious material are in a ratio of 1:1 by weight.

* * * * *